June 5, 1956        H. LLOYD        2,749,081
VALVE FOR USE WITH A TIMING MECHANISM
Filed March 18, 1954        2 Sheets-Sheet 1
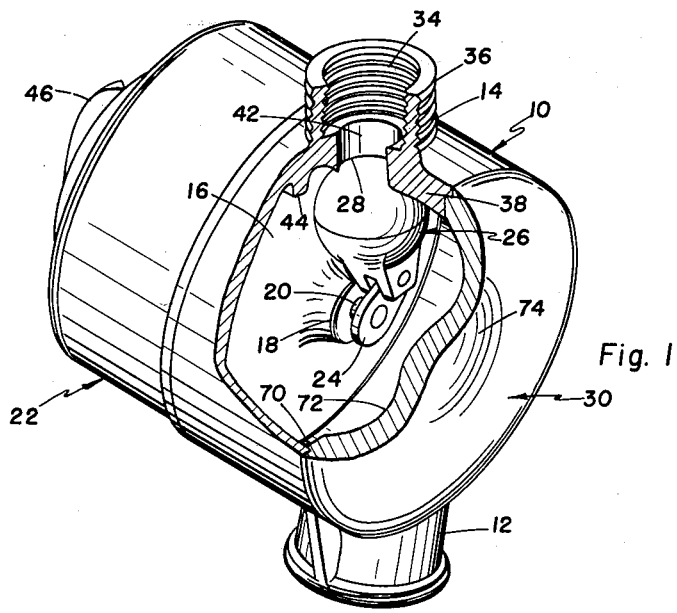
Fig. 1
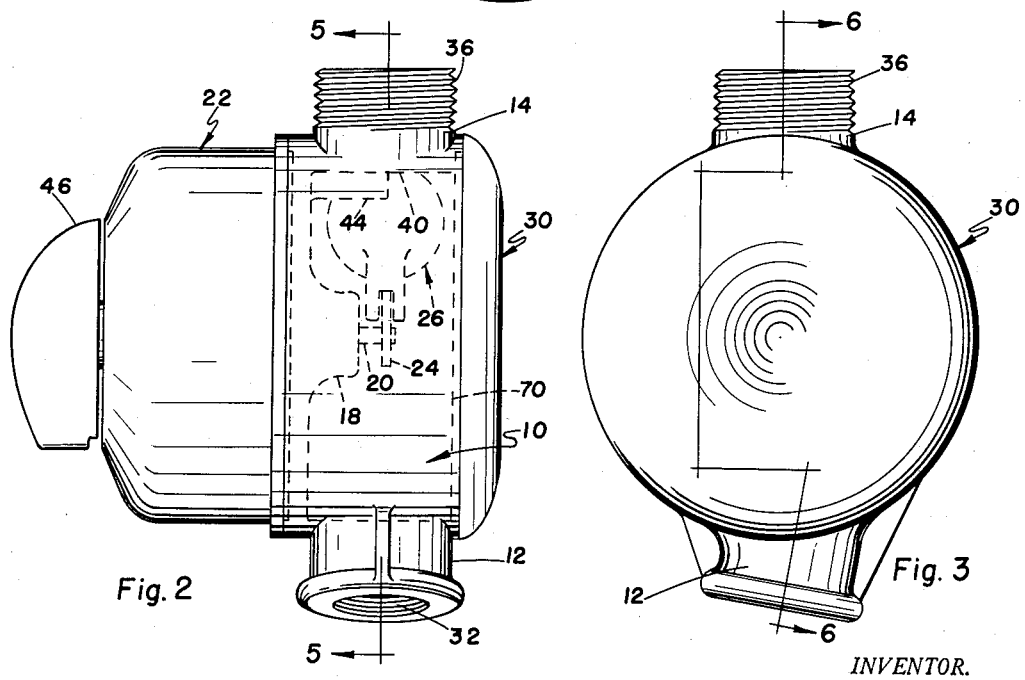
Fig. 2
Fig. 3
INVENTOR.
HAROLD LLOYD
BY *Knox & Knox*
Agents June 5, 1956  H. LLOYD  2,749,081
VALVE FOR USE WITH A TIMING MECHANISM
Filed March 18, 1954  2 Sheets-Sheet 2

INVENTOR.
HAROLD LLOYD
BY Knox & Knox
Agents

United States Patent Office 2,749,081
Patented June 5, 1956

2,749,081

VALVE FOR USE WITH A TIMING MECHANISM

Harold Lloyd, National City, Calif.

Application March 18, 1954, Serial No. 417,206

6 Claims. (Cl. 251—157)

The present invention relates generally to fluid flow control means and more particularly to a valve for use with a timing mechanism for shutting off the flow of fluid therethrough after a predetermined time interval.

The primary object of this invention is to provide a valve assembly for a timing valve having a novel jointed valve stem structure which enables a relatively low powered timing mechanism to seat the valve element firmly in place.

Another object of this invention is to provide a timing valve structure in which the flow of fluid assists the closing of the valve, the fluid inlet being directed to increase such assistance. The rocking action assures easy opening.

Another object of this invention is to provide a timing valve structure permitting a fully enclosed timing mechanism to be attached directly to the valve body.

Another object of this invention is to provide a timing valve structure which is compact and has a minimum number of working parts. A smooth closing action is achieved.

Another object of this invention is to provide a timing valve structure which is adapted for fabrication from many different materials, so that the choice of material can be according to the dictates of availability and price considerations, the exact sizes and proportions being matters easily determined to suit particular conditions and needs.

Another object of this invention is to provide a timing valve structure which is inexpensive and practicable to manufacture. Releasing or cocking structure is eliminated.

Finally, it is an object to provide a timing valve structure which is inexpensive and practicable to manufacture. Releasing or cocking structure is eliminated.

Finally, it is an object to provide a timing valve structure of the aforementioned character which is simple, safe and convenient to use, and which will give generally efficient and durable service.

With these and other objects definitely in view, this invention consists in the novel construction, combination and arrangement of elements and portions, as will be hereinafter fully described in the specification, particularly pointed out in the claims and illustrated in the drawings which form a material part of this disclosure and wherein similar characters of reference indicate similar or identical elements and portions throughout the specification and throughout the views of the drawing, and in which:

Fig. 1 is a perspective view of the valve, partially cut away to reveal the valve structure.

Fig. 2 is a side elevation view of the valve.

Fig. 3 is a rear elevation view of the valve.

Figure 4:
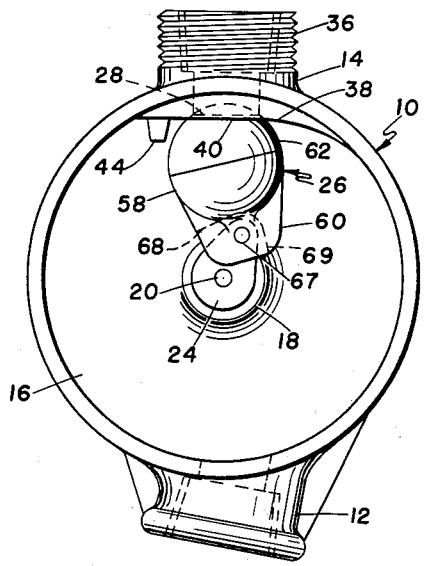
Fig. 4 is a rear elevation view with the rear cover plate removed, showing the valve in closed position.

Referring now to the drawings in general, the present valve comprises a valve body 10 having an inlet 12 and an outlet 14. The forward or closed end 16 of the body 10 has an internal hub 18, through which extends the shaft 20 for connection with a timer generally indicated at 22, which is secured to said closed end. Mounted on the shaft 20 is a radial valve stem 24 to the end of which is pivotally attached the valve element 26. In the closed position, the valve element 26 fits firmly into the valve seat 28 provided in the inner end of the outlet 14. The body 10 is closed and sealed by a rear cover plate 30.

The body 10 is preferably of unitary construction and generally cylindrical in shape, the inlet 12 and the outlet 14 being radial extensions of the body and located more or less directly opposite to each other. The inlet 12 is slightly angularly disposed to direct the incoming fluid in the general direction of the closing movement of the valve, so that the fluid flow assists the closing action. The inlet 12 has an internally threaded bore 32 to facilitate attachment of pipes or conduits. The outlet 14 has a similar internally threaded bore 34 and also has an externally threaded portion 36 so that various types of connections may be attached.

Adjacent the outlet 14, the body has a thickened portion 38 having a substantially flat inner surface 40. The valve seat 28 is cut in the flat surface 40 at the end of the outlet bore 42. Projecting inwardly from the thickened portion 38 is a stop 44, positioned at the side of the valve seat 28 to prevent over-travel of the valve when closing or when being fully opened for maximum time operation.

Figure 6:
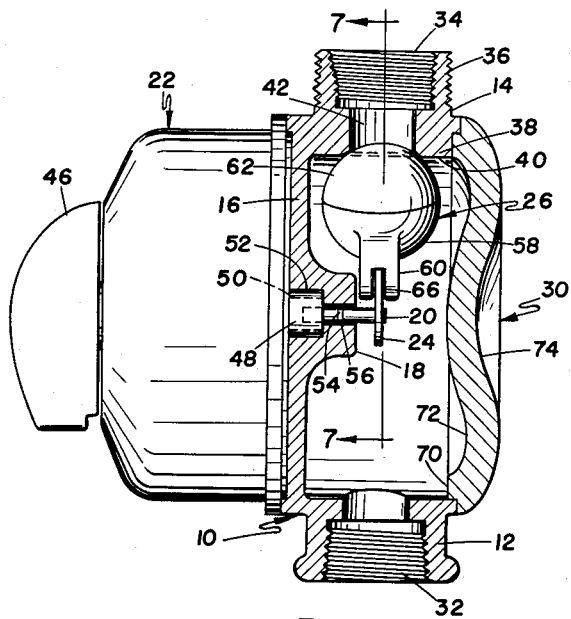
Fig. 6 is a sectional view taken on the line 6—6 of Fig. 3, portions being shown in full for clarity.
Figure 7:
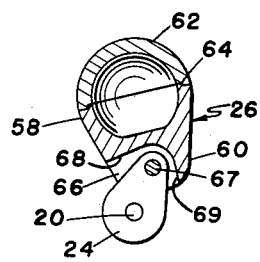
Fig. 7 is a fragmentary sectional view taken on the line 7—7 of Fig. 6 showing the structure of the valve element.

The timer 22 is of conventional clockwork type, many such timers being readily available, and has an actuating knob 46 with which the mechanism is set to close the valve after the elapse of the required time interval. The particular timer shown has a central boss 48 in which the drive shaft 50 is journalled, said boss fitting into a socket 52 provided in the closed end 16. The shaft 20 is secured in the end of the drive shaft 50 and is journalled in the hub 18, said shaft having an annular groove 54 in which is fitted an O-ring 56 to provide a fluid seal, as shown in Fig. 6.

The valve element 26 is substantially a hollow sphere and is constructed in two parts for convenience, namely, an inner portion 58 having an extended lug 60, and a hemispherical cap 62 which fits tightly on a shoulder 64 formed in said inner portion. The lug 60 has a substantially L-shaped slot 66 into which the valve stem 24 projects and wherein the valve stem is pivotally attached by a pin 67. The ends of the slot 66 comprise stops 68 and 69 which limit the pivotal movement of the valve element 26 relative to the valve stem 24, so that said valve element is held in the correct closing position when approaching the valve seat 28. The valve seat 28 is, of course, accurately shaped to receive the valve element 26 closely without leakage.

The cover plate 30 has a shouldered portion 70 which fits tightly into the open end of the body 10, the cover plate being secured and sealed in any suitable manner. The valve may be constructed of metal, plastics or other suitable material, certain plastics being ideal for the purpose and capable of withstanding considerable pressures. The particular type of cover plate 30 shown in the drawings is suitable for fabrication from plastic and has an annular depression 72 on the inner surface to provide maximum clearance for the valve element 26. The central portion of the cover plate 30 is inwardly depressed as indicated at 74, the curved construction being sufficiently rigid to prevent bursting under pressure.

Figure 5:
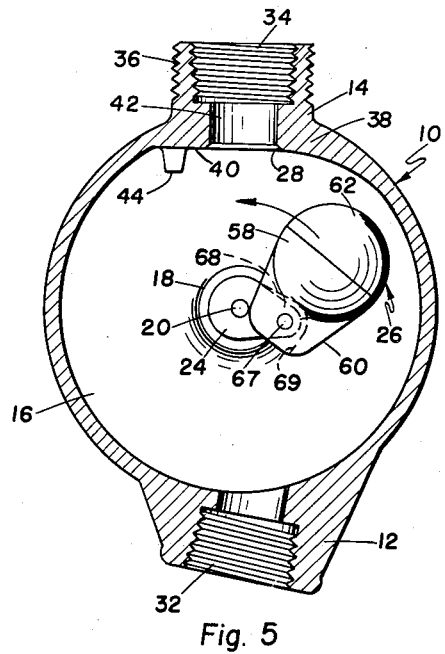
Fig. 5 is a sectional view taken on the line 5—5 of Fig. 2, but showing the valve in an open position.

It will be evident that the valve described herein may be used in many ways for timing the flow of fluid past a given point. A particular example is its use in connection with lawn sprinklers or the like in which it is desired to shut off the water after a certain time. The valve may be installed at any convenient position in the water system, such as at the water outlet. The timer is set at the required time by rotating the actuating knob 46, thus winding the timing mechanism and opening the valve. As the timing mechanism operates, the shaft 20 rotates slowly carrying the valve element 26 around in the direction of the arrow in Fig. 5. The valve element 26, being hollow and substantially buoyant, tends to float upwardly as the valve approaches the closed position. As shown in Fig. 5, this upward floating is limited by the end of the slot 66 bearing on the valve stem 24 so that the valve element 26 is held in the correct position for entering the valve seat 28. As the valve element 26 enters the valve seat 28 the timer continues to rotate the shaft 20 so that the valve element is forced firmly home by the knee action of the valve stem 24 pivoted in the lug 60. The mechanical advantage of this type of knee action joint is such that the comparatively low torsional force of the timer 22 is sufficient to hold the valve element 26 tightly in place. With reference to Figs. 1 and 4, it will be seen that the "knee" formed by the valve stem 24 and the valve element 26 remains bent even when in the closed position, so that the valve is held closed by the slight remaining torsion of the timer 22.

The angular disposition of the inlet 12 causes the fluid to flow through the body 10 generally in the direction of movement of the closing valve, thus the closing action of the timer 22 is augmented rather than hindered by the fluid flow. Further, the pressure of the fluid tends to hold the valve element 26 tightly in place when closed, so ensuring an efficient seal.

The operation of this invention will be clearly comprehended from a consideration of the foregoing description of the mechanical details thereof, taken in connection with the drawing and the above recited objects. All said objects are obviously amply achieved by this invention.

Further description would appear to be unnecessary.

It is understood that minor variation from the form of the invention disclosed herein may be made without departure from the spirit and scope of the invention, and that the drawing and specification are to be considered as merely illustrative rather than limiting.

I claim:

1. A fluid flow valve comprising a valve body having an inlet and an outlet, a shaft rotatably mounted in said body for connection with a timing mechanism, a valve stem extending radially from said shaft and having a portion connected to said shaft, a valve element pivotally attached to said valve stem for pivotal movement on an axis generally parallel to said shaft, whereby said valve element and said valve stem together constitute a knee jointed element, and a valve seat in said outlet, said valve element seating on said seat when said shaft is in one position.

2. A fluid flow valve comprising a valve body having an inlet and an outlet, a shaft rotatably mounted in said body for direct connection with a timing mechanism such that initial setting of the timing mechanism simultaneously opens the valve, a valve stem extending radially from said shaft and having a portion connected to said shaft, a valve element pivotally attached to said valve stem, a valve seat in said outlet, said valve element seating on said seat when said shaft is in one position, and a projecting stop adjacent said valve seat positioned to prevent travel of said valve element beyond the seat, said inlet being angularly offset to direct the flow of incoming fluid in the general direction of movement of said valve element during the closing thereof.

3. A fluid flow valve comprising a valve body having an inlet and an outlet, a shaft rotatably mounted in said body for connection with a timing mechanism, a valve stem extending radially from said shaft and having a portion connected to said shaft, a valve element pivotally attached to said valve stem for pivotal movement on an axis generally parallel to said shaft, whereby said valve element and said valve stem together constitute a knee jointed element, said valve element and said valve stem together constituting a knee jointed assembly, whereby a small rotative force applied to said shaft results in the application of considerable force on said valve element to hold said valve element in closed position, a valve seat in said outlet, said valve element seating on said seat when said shaft is in one position, and a projecting stop adjacent said valve seat positioned to prevent travel of said valve element beyond the seat, said inlet being angularly offset to direct the flow of incoming fluid in the general direction of movement of said valve element during the closing thereof.

4. A fluid flow valve comprising a valve body having an inlet and an outlet, a shaft rotatably mounted in said body for connection with a timing mechanism, a valve stem extending radially from said shaft, a valve element having a substantially L-shaped slot, one end portion of the valve stem being pivotally mounted in said slot so that said valve element is pivoted on an axis generally parallel to said shafts, the ends of said slot constituting stops for engaging said valve stem to limit the pivotal movement of said valve element thereon, and a valve seat in said outlet, said valve element seating on said seat when said shaft is in one position.

5. A fluid flow valve comprising a valve body having an inlet and an outlet, a shaft rotatably mounted in said body for connection with a timing mechanism, a valve stem extending radially from said shaft, a generally spherical, hollow valve element having an extended lug, said lug having a substantially L-shaped slot therein, one end portion of the valve stem being pivotally mounted in said slot so that said valve element is pivoted on an axis generally parallel to said shafts, the ends of said slot constituting stops for engaging said valve stem to limit the pivotal movement of said valve element thereon, and a valve seat in said outlet, said valve element seating on said seat when said shaft is in one position.

6. A fluid flow valve comprising a valve body having an inlet and an outlet, a shaft rotatably mounted in said body for connection with a timing mechanism, a valve stem extending radially from said shaft, a generally spherical, hollow valve element having an extended lug, said lug having a substantially L-shaped slot therein, one end portion of the valve stem being pivotally mounted in said slot so that said valve element is pivoted on an axis generally parallel to said shafts, the ends of said slot constituting stops for engaging said valve stem to limit the pivotal movement of said valve element thereon, and a valve seat in said outlet, said valve element seating on said seat when said shaft is in one position, a projecting stop on said valve body adjacent said valve seat and positioned to prevent travel of said valve element beyond the seat, said inlet being angularly offset to direct the flow of incoming fluid in the general direction of movement of said valve element in its closing action.

References Cited in the file of this patent

UNITED STATES PATENTS

| 167,397 | Franke | Sept. 7, 1875 |
| 257,449 | Pratt | May 2, 1882 |
| 1,312,839 | Dembowsky | Aug. 12, 1919 |
| 2,059,687 | Gagg | Nov. 3, 1936 |
| 2,556,908 | Engholdt | June 12, 1951 |